(12) United States Patent
Matlack et al.

(10) Patent No.: US 11,214,020 B2
(45) Date of Patent: Jan. 4, 2022

(54) FABRICATION METHOD AND APPARATUS FOR CREATING LARGE AND/OR COMPLEX THERMOPLASTIC COMPOSITE COMPONENTS

(71) Applicant: The Boeing Company, Chicago, IL (US)

(72) Inventors: Mike P. Matlack, St. Charles, MO (US); Alexander M. Rubin, St. Louis, MO (US); Randall D. Wilkerson, O'Fallon, MO (US); Amol Ogale, Munich (DE)

(73) Assignee: The Boeing Company, Chicago, IL (US)

( * ) Notice: Subject to any disclaimer, the term of this patent is extended or adjusted under 35 U.S.C. 154(b) by 121 days.

(21) Appl. No.: 16/552,199

(22) Filed: Aug. 27, 2019

(65) Prior Publication Data

US 2021/0060873 A1  Mar. 4, 2021

(51) Int. Cl.
*B29C 43/36* (2006.01)
*B29C 70/44* (2006.01)
(Continued)

(52) U.S. Cl.
CPC .............. *B29C 70/42* (2013.01); *B29C 33/02* (2013.01); *B29C 35/0227* (2013.01);
(Continued)

(58) Field of Classification Search
CPC ....... B29C 33/02; B29C 33/306; B29C 43/12; B29C 43/3642; B29C 2043/3222; B29C 2043/3649; B29C 51/28; B29C 70/44
See application file for complete search history.

(56) References Cited

U.S. PATENT DOCUMENTS 4,475,976 A * 10/1984 Mittelstadt ............ B29C 70/342
100/211
4,504,341 A * 3/1985 Radzwill ................. B29C 51/28
156/102
(Continued)

FOREIGN PATENT DOCUMENTS

WO  WO2018167741  9/2018

OTHER PUBLICATIONS

Office Action dated January 20, 2021, issued in co-pending European Patent Application No. 20186655.5.

*Primary Examiner* — James P Mackey
(74) *Attorney, Agent, or Firm* — Quinn IP Law

(57) ABSTRACT

This disclosure is directed to a thermoplastic composite material forming method and tooling used to perform the method. More specifically, this disclosure is directed to a method of fabricating large, complex thermoplastic composite part shapes with a consolidation tool having a conformable tooling bladder that heat thermoplastic material in the tool and provide thermoplastic material consolidation pressure in directions in the tool to form a part shape of thermoplastic composite material. A novel tooling concept is used to fabricate large, complex thermoplastic composite part shapes which are not easily producible using traditional methods. The tooling concept employs a consolidation tool that provides a method to apply thermoplastic material consolidation pressure by a conformable tooling bladder that provides thermoplastic material consolidation pressure in directions in the tool that are not achievable by conventional clamshell type molds where the mold parts move in substantially vertical tool opening and tool closing directions.

20 Claims, 5 Drawing Sheets

(51) Int. Cl.
   *B29C 70/42* (2006.01)
   *B29C 33/02* (2006.01)
   *B29C 35/02* (2006.01)
   *B29K 101/12* (2006.01)
   *B29C 43/12* (2006.01)
   *B29C 51/28* (2006.01)
   *B29C 33/30* (2006.01)

(52) U.S. Cl.
   CPC ............ *B29C 33/306* (2013.01); *B29C 43/12* (2013.01); *B29C 43/3642* (2013.01); *B29C 51/28* (2013.01); *B29C 70/44* (2013.01); *B29K 2101/12* (2013.01)

(56) References Cited

U.S. PATENT DOCUMENTS

| | | | | |
|---|---|---|---|---|
| 7,527,759 | B2* | 5/2009 | Lee | B29C 33/307 264/319 |
| 8,557,165 | B2* | 10/2013 | Jones | B29C 33/308 264/320 |
| 9,162,396 | B2* | 10/2015 | Coxon | B29C 70/541 |
| 9,481,115 | B2* | 11/2016 | Funnell | B29D 99/0014 |
| 9,782,937 | B1* | 10/2017 | Modin | B29C 70/30 |
| 2005/0051932 | A1 | 3/2005 | Danzik | |
| 2006/0231981 | A1 | 10/2006 | Lee et al. | |
| 2011/0221093 | A1* | 9/2011 | Perrow | B29C 70/48 264/255 |
| 2015/0013894 | A1 | 1/2015 | Matsen et al. | |
| 2016/0129646 | A1 | 5/2016 | Cadogan et al. | |

* cited by examiner

FABRICATION METHOD AND APPARATUS FOR CREATING LARGE AND/OR COMPLEX THERMOPLASTIC COMPOSITE COMPONENTS

FIELD

This disclosure is directed to a thermoplastic composite material forming method and tooling used to perform the method. More specifically, this disclosure is directed to a consolidation tool that provides a method to apply thermoplastic material consolidation pressure by a conformable tooling bladder.

BACKGROUND

In the fabrication of aerospace level quality composite parts, the benefits of thermoplastic composites are needed, such as rapid processing and improved material properties than those possible with thermoset composites. Thus, thermoplastic composite parts are preferred over thermoset composite parts.

However, complex thermoplastic composite parts are not easily producible using traditional methods. Compound mold line shapes of thermoplastic composite often cannot be produced by conventional clamshell type molds where the mold parts move in substantially vertical tool opening and tool closing directions. Current tooling systems typically do not provide sufficient consolidation pressure for complex thermoplastic composite mold line shapes.

In the production of large and/or complex thermoplastic composite parts, rapid material layup by conventional molding methods (i.e., clamshell molding methods) is not currently capable of supporting high rate manufacturing. Additionally, the effects of thermal expansion in the molding of thermoplastic composite parts creates difficulty in achieving aerospace level quality using traditional tooling.

SUMMARY

This disclosure is directed to a novel tooling concept and its method of use in fabricating complex thermoplastic composite parts which are not easily producible using traditional methods. The consolidation tool used in fabricating complex thermoplastic composite parts includes a base having a tool surface with a cavity recessed downwardly into the tool surface.

A first insert is removably positioned in the cavity. The first insert has a first cross-section configuration. The first insert is replaceable in the cavity by a second insert or by an insert of other multiple inserts having different cross-section configurations.

The cross-section configuration of the first insert is defined by a groove in the first insert. The groove has a cross-section configuration corresponding to the part to be fabricated. The groove is configured for receiving a tube of thermoplastic material in the groove, and holding the tube of thermoplastic material in the groove as the tube of thermoplastic material is slit and spread out as a sheet of thermoplastic material across the groove.

A tubular pressure bladder is configured for being positioned in the groove on top of the sheet of thermoplastic material spread across the groove. The pressure bladder is adjustably heated. The pressure bladder is inflatable in the groove to heat and to exert a pressure force against the sheet of thermoplastic material spread across the groove and press the sheet of thermoplastic material in multiple directions into the groove.

A press having a bottom surface is supported on the base. The press is movable toward and away from the tool surface of the base and toward and away from the first insert inserted into the cavity in the tool surface. The bottom surface of the press is configured to engage against the tool surface of the base and against the pressure bladder inflated in the groove on the top of the sheet of thermoplastic material spread across the groove. As the press is moved toward the tool surface of the base, the sheet of thermoplastic material spread across the groove is pressed in multiple directions into the groove by the pressure bladder inflated in the groove and by the bottom surface of the press engaging against the tool surface of the base and against the pressure bladder.

As the press and the inflated pressure bladder press the sheet of thermoplastic material spread across the groove into the groove, the first insert and the pressure bladder are heated, applying heat to the sheet of thermoplastic material. The heat applied to the sheet of thermoplastic material and the pressure applied against the thermoplastic material by the bottom surface of the press and the inflated pressure bladder conform the sheet of thermoplastic material to the cross-section configuration of the groove in the first insert, thereby fabricating the thermoplastic composite part.

The insert and pressure bladder are then cooled, the pressure bladder is deflated and the thermoplastic composite part is removed from the consolidation tool.

The features, functions, and advantages that have been discussed can be achieved independently in various embodiments or may be combined in yet other embodiments, further details of which can be seen with reference to the following description and drawings.

DETAILED DESCRIPTION

Figure 1:
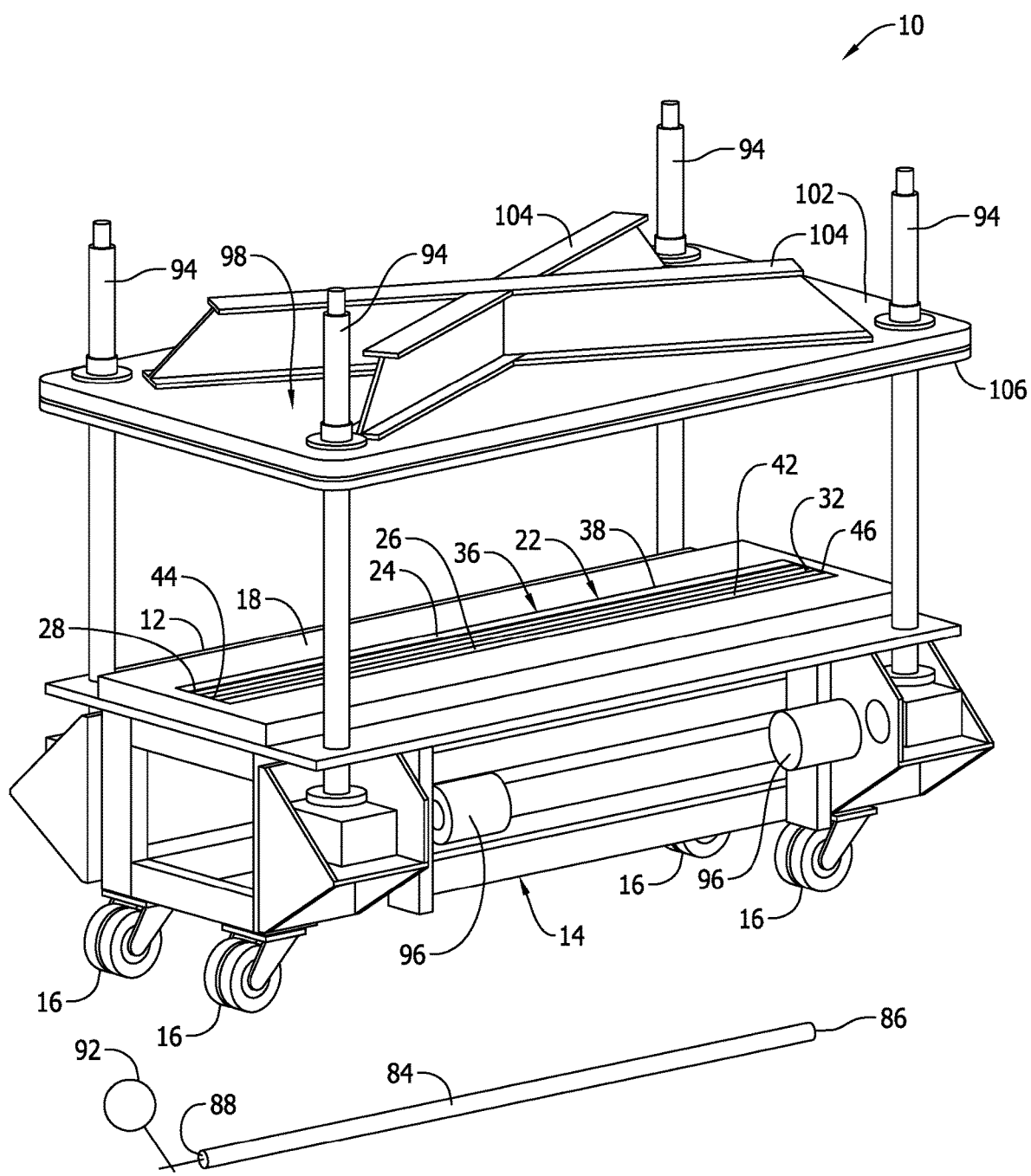
FIG. 1 is a representation of a perspective view of the consolidation tool of this disclosure.
Figure 2:
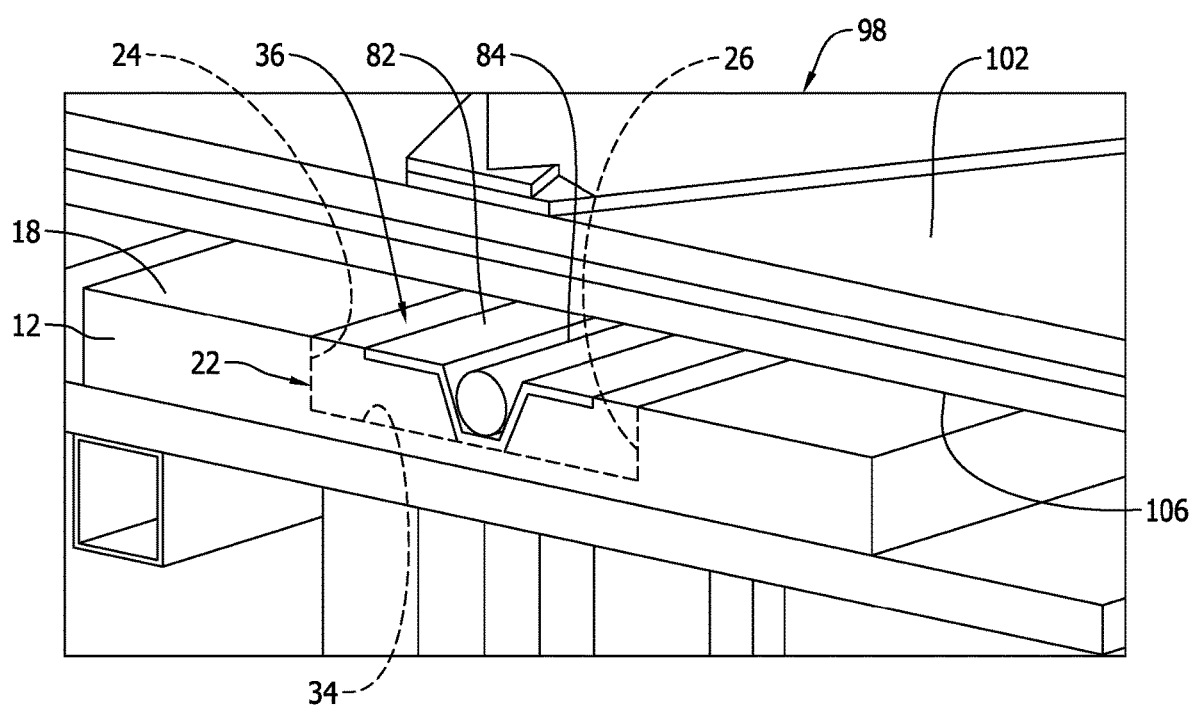
FIG. 2 is a representation of a perspective view of a cross-section through the consolidation tool of FIG. 1, along the line 2-2 of FIG. 1.
Figure 3:
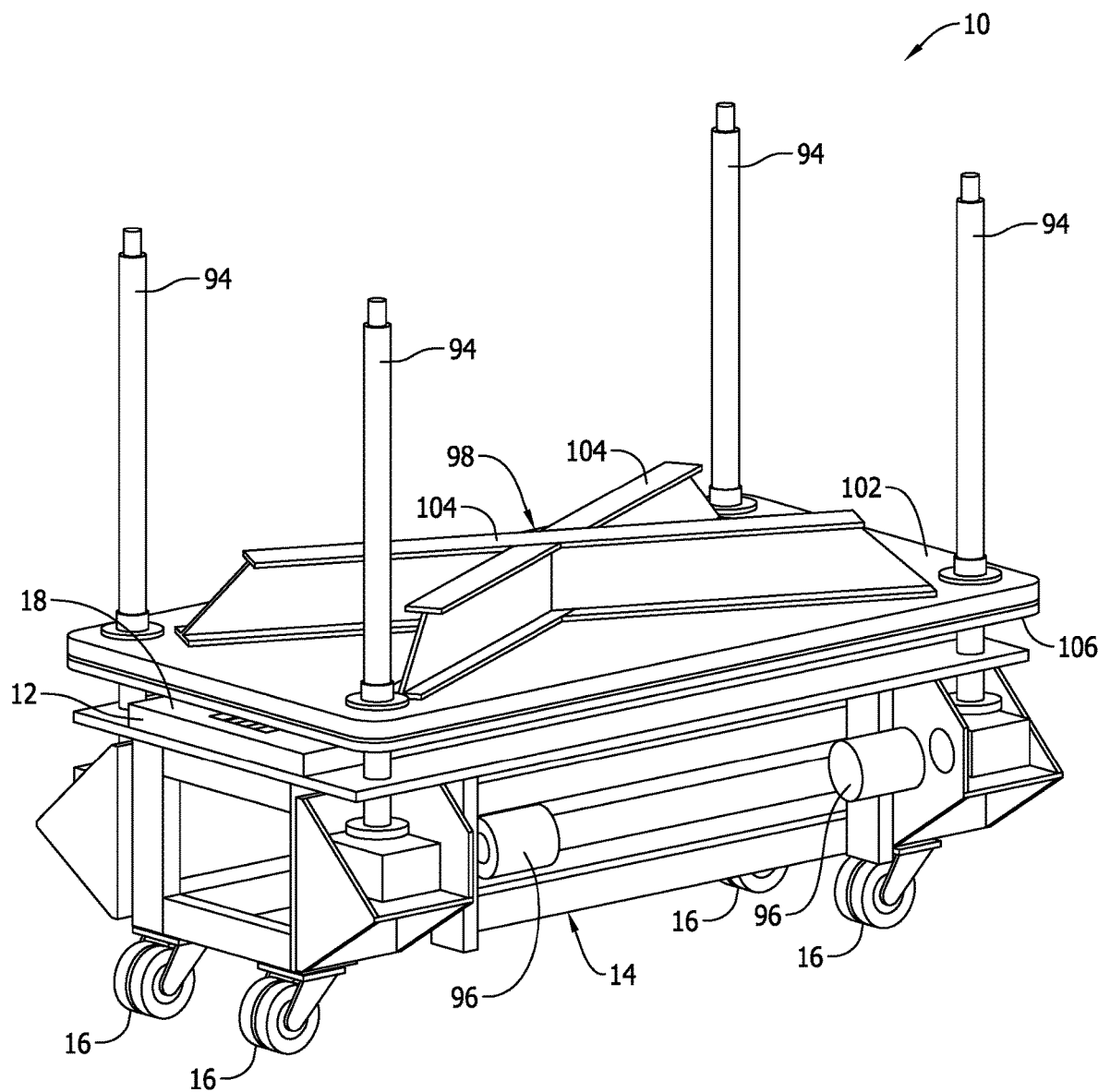
FIG. 3 is a representation of the consolidation tool of FIG. 1 with the tool closing to perform the method of consolidating thermoplastic composite material.

FIGS. 1-3 are representations of the consolidation tool 10 used in consolidating thermoplastic composite material. As stated earlier, the consolidation tool is used in fabricating complex thermoplastic composite part shapes which are not easily producible using traditional methods and tooling. The component parts of the consolidation tool 10 are constructed of materials that provide the tool with sufficient strength to operate in the manner to be described.

The consolidation tool 10 includes a base 12. The base 12 is secured to the top of a framework 14 that supports the base. Four rollers or wheels 16 are secured to the bottom of the framework 14. The rollers or wheels 16 enable the consolidation tool 10 to be mobile.

The base 12 is represented in FIGS. 1-3 as having a rectangular configuration. The base 12 could be provided with other configurations, depending on the shape of the part to be formed by the consolidation tool 10. The base 12 has a tool surface 18 on the top of the base 12. The tool surface 18 has a planar configuration. The tool surface 18 could have various other configurations, depending on the configuration of the composite part to be formed in the consolidation tool 10.

A cavity 22 is recessed downwardly into the tool surface 18. The cavity 22 can be machined into the tool surface 18 or formed in the tool surface by other equivalent methods. The cavity 22 is represented in FIG. 1 as having an elongate, rectangular configuration. However, depending on the shape of the part to be formed by the consolidation tool 10, the cavity 22 could have other configurations. From the orientation of the consolidation tool 10 represented in FIGS. 1-3, the configuration of the cavity 22 is defined by a first interior side wall 24 and an opposite second interior side wall 26 that extend along the length of the cavity 22 and define a width dimension of the cavity. The first interior side wall 24 and the second interior side wall 26 are parallel. The configuration of the cavity 22 is also defined by a first interior end wall 28 and a second interior end wall 32 at opposite ends of the cavity 22 that define a length dimension of the cavity. The first interior side wall 24, the second interior side wall 26, the first interior end wall 28 and the second interior end wall 32 extend downwardly from the tool surface 18 into the base 12 to an interior bottom surface 34 of the cavity 22. The first interior side wall 24 and the second interior side wall 26 converge slightly toward each other as they extend downwardly into the cavity 22 and the first interior end wall 28 and the second interior end wall 32 converge slightly toward each other as they extend downwardly into the cavity 22.

A first insert 36 is constructed to fit into the cavity 22. The first insert 36 is constructed of a metal having a coefficient of thermal expansion (CTE) that is close to zero. An example of such material is Invar® produced by APERAM ALLOYS IMPHY of St. Denis, France. Other equivalent types of materials could also be employed. The first insert 36 has a first cross-section configuration. The first insert 36 has an exterior configuration that substantially matches the configuration of the cavity 22, and that is slightly smaller than the configuration of the cavity 22 enabling the first insert 36 to be easily inserted into the cavity 22 and removed from the cavity 22. FIG. 2 is a representation of the first insert 36 removably positioned in the cavity 22. The exterior configuration of the first insert 36 is defined by a first exterior side wall 38 and a second exterior side wall 42 at opposite sides of the insert, and a first exterior end wall 44 and a second exterior end wall 46 at opposite ends of the insert 36. The first exterior side wall 38 and the second exterior side wall 42 define a width dimension of the insert 36, and the first exterior end wall 44 and the second exterior end wall 46 define a length dimension of the insert 36. The width dimension of the insert 36 is just slightly smaller than the width dimension of the cavity 22 and the length dimension of the insert 36 is just slightly smaller than the length dimension of the cavity 22. This enables the insert 36 to be easily positioned in the cavity 22 and removed from the cavity. The insert 36 also has a top surface 48 and an opposite bottom surface 52. With the insert 36 positioned in the cavity 22 with the bottom surface 52 of the insert engaging on the interior bottom surface 34 of the cavity 22, the top surface 48 of the insert 36 is coplanar with the top surface 18 of the base 12.

Figure 4:
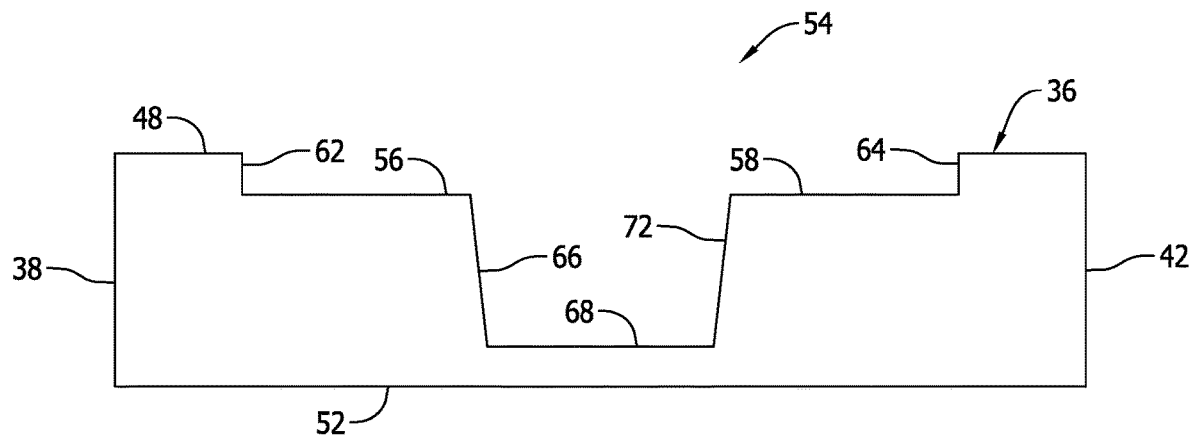
FIG. 4 is a representation of a cross-section of an insert represented in FIG. 2.

There is a first groove 54 in the top surface 48 of the first insert 36. As represented in FIGS. 2 and 4, the groove 54 has a cross-section configuration of the thermoplastic composite part to be formed by the consolidation tool 10. The groove 54 is configured for receiving a tube of thermoplastic material in the groove 54 and holding the tube of thermoplastic material in the groove 54 as the tube of thermoplastic material is slit and spread out as a sheet of thermoplastic material across the groove 54. This is later explained in more detail. The groove 54 has a first recessed surface 56 and a second recessed surface 58 at opposite sides of the groove. The first recessed surface 56 and the second recessed surface 58 are coplanar. A first side surface 62 extends downwardly from the insert top surface 48 to the first recessed surface 56. A second side surface 64 extends downwardly from the top surface 48 of the insert 36 to the second recessed surface 58. A third side surface 66 extends downwardly from the inner edge of the first recessed surface 56 to a bottom surface 68 of the groove 54. A fourth side surface 72 extends downwardly from the inner edge of the second recessed surface 58 to the bottom surface 68 of the groove 54. Together, the first recessed surface 56, the second recessed surface 58, the first side surface 62, the second side surface 64, the third side surface 66, the bottom surface 68 and the fourth side surface 72 define a cross-section configuration of the groove 54. The particular cross-section configuration of the groove 54 represented in FIGS. 2 and 4 is a cross-section configuration of a top hat stringer to be formed by the consolidation tool 10. The cross-section configuration of the groove 54 in the first insert 36 is only one representation of a possible cross-section configuration of a groove for a first insert 36.

Figure 5:
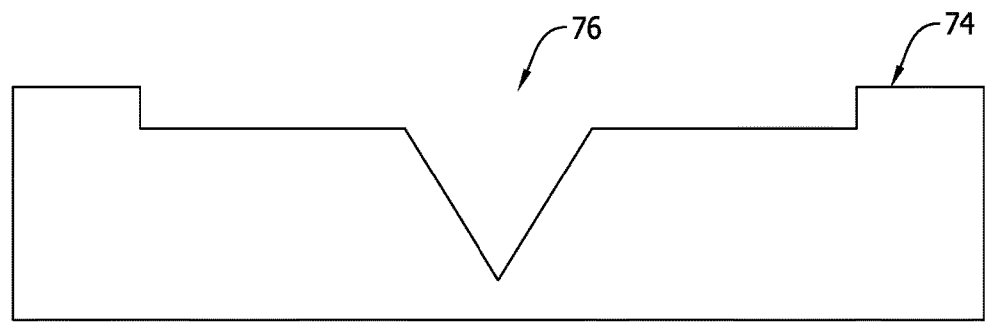
FIG. 5 is a representation of a cross-section of a second insert.
Figure 6:
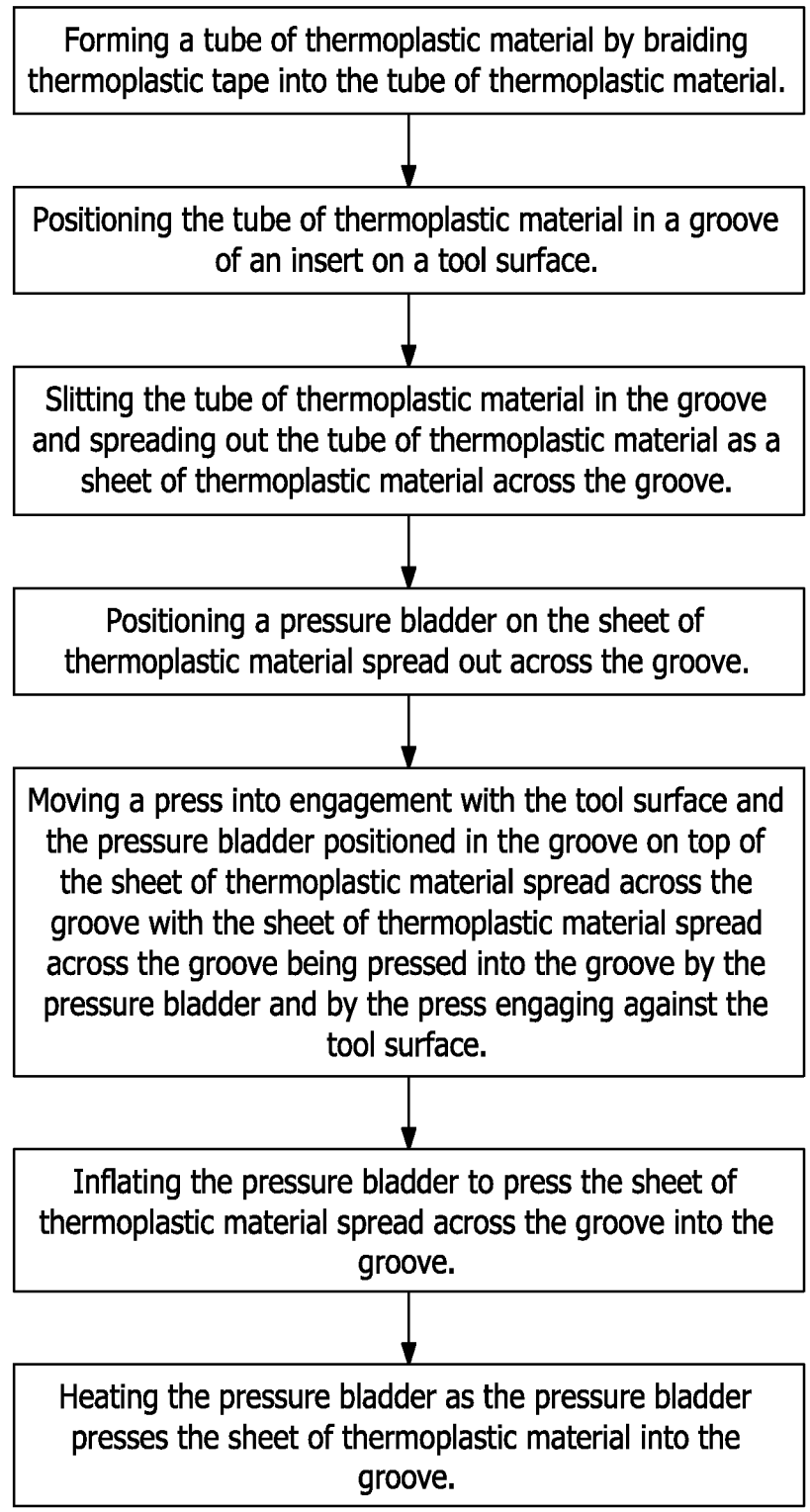
FIG. 6 is a flow chart representing a method of this disclosure.

The insert 36 is a first insert that is removable from the cavity 22. FIG. 5 is a representation of a second cross-section configuration of a second insert 74 having a second groove 76. The second insert 74 is insertable into the cavity 22 when the first insert 36 has been removed from the cavity 22. As represented in FIG. 5, the second cross-section configuration of the second groove 76 in the second insert 74 is different from the first cross-section configuration of the first groove 54 in the first insert 36. Thus, by replacing the first insert 36 in the consolidation tool 10 with the second insert 74 or with any other insert having a cross-section configuration different than the cross-section configuration of the first insert 36, the consolidation tool 10 can be used to fabricate various different thermoplastic composite parts having different cross-section configurations.

In FIG. 2, there is represented a sheet of thermoplastic material or thermoplastic composite material 82 that has been inserted into the groove 54 and spread out across the groove. Prior to being spread out across the groove 54, the sheet of thermoplastic composite material 82 is formed from unidirectional thermoplastic composite tape that is slit into narrow strips, for example 0.125" strips. The slit material strips are then loaded into a braiding wheel. A preform tube is then braided from the slit material strips. The preform tube may be a single layer of the braided slit material strips, or multiple layers of the braided slit material strips. The tube of thermoplastic material is then removed from the braiding machine. The tube of thermoplastic material is then received in the groove 54. The groove 54 holds the tube of thermoplastic material in the groove as the tube of thermoplastic material is slit and spread out as the sheet of thermoplastic material 82 across the groove.

The consolidation tool 10 also includes a pressure bladder 84. The pressure bladder 84 is constructed of material that can withstand high pressure, for example 150 PSI, and high temperature, for example 750° F. An example of such material is a polyimide material. Other equivalent types of materials could also be used in constructing the pressure bladder 84. The pressure bladder 84 is configured for being positioned in the groove 54 on top of the sheet of thermoplastic material 82 spread across the groove 54. The pressure bladder 84 is inflatable. Also, the pressure bladder 84 is a heated pressure bladder 84. The pressure bladder 84 is also a cooled pressure bladder 84. The pressure bladder 84 has a tubular configuration dimensioned to fit into the groove 54 of the first insert with the sheet of thermoplastic composite material 82 having been previously spread across the groove 54. The tubular configuration of the pressure bladder 84 has a closed, distal end 86 adjacent the second interior end wall 32 of the cavity 22. An opposite proximal end 88 of the pressure bladder 84 is connectable to a source of fluid pressure 92, for example a variable, pulsed pressure pump 92 represented schematically in FIG. 1. The pump 92 communicates with the pressure bladder 84 and is operable to selectively supply pressurized air into the pressure bladder 84. The pump 92 is also operable to selectively heat the air to supply heated pressurized air into the pressure bladder 84 and to cool the air to supply cooled pressurized air into the pressure bladder 84. Thus, the variable pressure pump 92 communicating with the pressure bladder 84 is a heat source connected in communication with the pressure bladder 84 and is a cooling source connected in communication with the pressure bladder 84. The pressure bladder 84 is inflatable in the groove 54 to exert a pressure force against the sheet of thermoplastic material 82 spread across the groove 54 and press the sheet of thermoplastic material 82 into the groove 54.

Four linear actuator posts 94 are mounted on the framework 14. The linear actuator posts 94 could be hydraulic, pneumatic, mechanical or some other equivalent type of actuator. The linear actuator posts 94 are oriented parallel to each other and are positioned at the four corners of the framework 14 and the four corners of the base 12 as represented in FIG. 1. In this disclosure, each of the linear actuator posts 94 is mechanical and is operated by an electric motor 96 associated with the post.

A press 98 is mounted on the four linear actuator posts 94, The press 98 has a top surface 102 reinforced with I beams 104 secured to the top surface 102 in a crossed configuration. The press 98 has an opposite bottom surface 106 that is configured to engage against the tool surface 18 of the base 12. The bottom surface 106 of the press 98 is also configured to engage against the pressure bladder 84 positioned in the groove 54 on top of the sheet of thermoplastic material 82 spread across the groove. The press 98 is movable toward and away from the tool surface 18 of the base 12 by selective operation of the four electric motors 96 associated with the four linear actuator posts 94 which causes the linear actuator posts 94 to selectively raise and lower the press 98. The bottom surface 106 of the press 98 engages against the tool surface 18 of the base 12 and the pressure bladder 84 positioned in the groove 54 on top of the sheet of thermoplastic material 82 spread across the groove 54 in response to the press 98 being moved toward the tool surface 18 of the base 12. This results in the sheet of thermoplastic material 82 spread across the groove 54 being pressed into the groove 54 by the pressure bladder 84 inflated in the groove 54 and the bottom surface 106 of the press 98 engaging against the tool surface 18 of the base 12 and the pressure bladder 84.

In use of the consolidation tool 10 in fabricating a thermoplastic composite part, a tube of thermoplastic material is first formed. The tube of thermoplastic material is formed by braiding thermoplastic tape into the tube configuration of the thermoplastic material. The tube of thermoplastic material is then positioned in the groove 54 of the first insert 36. With the tube of thermoplastic material positioned in the groove 54, the tube of thermoplastic material is then slit along its length in the groove 54. The slit tube of thermoplastic material is then spread out as a sheet of thermoplastic material 82 across the groove 54.

The pressure bladder 84 is then positioned on the sheet of thermoplastic material 82 spread out across the groove 54. The pressure bladder 84 is positioned on the sheet of thermoplastic material 82 with the length of the pressure bladder extending along the length of the groove 54.

The electric motors 96 of the four linear actuator posts 94 are then simultaneously operated to cause the press 98 to move downwardly on the linear actuator posts 94 toward the tool surface 18 of the base 12. As the press 98 is moved downwardly toward the tool surface 18 of the base 12, the bottom surface 106 of the press 98 comes into contact with the pressure bladder 84 on the sheet of thermoplastic material 82 positioned in the groove 54, and in contact with portions of the sheet of thermoplastic material 82 positioned in the groove 54 on opposite sides of the pressure bladder 84. As the press 98 is continued to move downwardly, the pressure bladder 84 is inflated and heated. The first insert 36 is also heated. The heating of the pressure bladder 84 could be provided by the source of fluid pressure or the pump 92 supplying heated air to the pressure bladder 84. The first insert 36 could have a heat source built into the first insert, or the first insert 36 could be heated by a separate source. The heat applied to the sheet of thermoplastic material 82 spread across the groove 54 and the pressure applied against the thermoplastic material 82 by the bottom surface 106 of the press 98 and by the inflated pressure bladder 84 conform the sheet of thermoplastic material 82 to the cross-section configuration of the groove 54 in the first insert 36 as represented in FIG. 2, thereby fabricating the thermoplastic composite part.

The first insert 36 and the pressure bladder 84 are then cooled, controlling the cooling of the fabricated thermoplastic composite part and preventing shrinking. The press 98 is then raised by the electric motors 96 operating the four linear actuator posts 94. The pressure bladder 84 is deflated and removed from the groove 54 in the first insert 36. The thermoplastic composite part represented in FIG. 2 is then removed from the consolidation tool 10.

As various modifications could be made in the construction of the fixture that holds a specimen for electric discharge machining of the specimen and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A consolidation tool comprising:
   a base, the base having a tool surface on a top of the base;
   a cavity recessed downwardly into the tool surface of the base;
   a first insert removably positioned in the cavity, the first insert having a first cross-section configuration;
   a groove in the first insert, the groove having a configuration for receiving a tube of thermoplastic material in the groove and holding the tube of thermoplastic material in the groove as the tube of thermoplastic material is slit and spread out as a sheet of thermoplastic material across the groove;

a pressure bladder, the pressure bladder being configured for being positioned in the groove on top of the sheet of thermoplastic material spread across the groove, the pressure bladder being inflatable in the groove to exert a pressure force against the sheet of thermoplastic material spread across the groove and press the sheet of thermoplastic material into the groove; and, a press supported on the base, the press having a bottom surface on a bottom of the press, the press being movable toward and away from the tool surface of the base, the bottom surface of the press being configured to engage against the tool surface of the base and the pressure bladder positioned in the groove on top of the sheet of thermoplastic material spread across the groove in response to the press being moved toward the tool surface of the base with the sheet of thermoplastic material spread across the groove being pressed into the groove by the pressure bladder inflated in the groove and the bottom surface of the press engaging against the tool surface of the base and the pressure bladder.

2. The consolidation tool of claim 1, further comprising:
a variable pressure pump communicating with the pressure bladder.

3. The consolidation tool of claim 2, further comprising:
a heat source connected in communication with the pressure bladder.

4. The consolidation tool of claim 3, further comprising:
a cooling source connected in communication with the pressure bladder.

5. The consolidation tool of claim 1, further comprising:
a pump communicating with the pressure bladder, the pump being operable to selectively supply, heated, pressurized air to the pressure bladder.

6. The consolidation tool of claim 1, further comprising:
the groove in the first insert is a first groove;
the first insert is removable from the cavity; and,
a second insert, a second groove in the second insert, the second insert is insertable into the cavity when the first insert has been removed from the cavity.

7. The consolidation tool of claim 6, further comprising:
the second insert having a second cross-section configuration; and,
the first cross-section configuration of the first insert and the second cross-section configuration of the second insert being different cross-section configurations.

8. The consolidation tool of claim 1, further comprising:
the base being a mobile base.

9. The consolidation tool of claim 1, further comprising:
the groove in the first insert having a configuration for receiving a tube of thermoplastic material formed by braiding thermoplastic tape.

10. The consolidation tool of claim 1, further comprising:
a heat source connected in communication with the pressure bladder to selectively heat the pressure bladder and heat the sheet of thermoplastic material spread across the groove and conform the sheet of thermoplastic material to the cross section configuration of the groove; and,
a cooling source connected in communication with the pressure bladder to selectively cool the pressure bladder and control cooling of the thermoplastic material and prevent shrinking of the thermoplastic material.

11. The consolidation tool of claim 10, further comprising:
both the heat source and the cooling source are a variable pressure pump.

12. The consolidation tool of claim 1, further comprising:
the first insert is heated.

13. A consolidation tool comprising:
a groove, the groove is configured for receiving a tube of thermoplastic material in the groove and holding the tube as the tube is slit and spread out as a sheet of thermoplastic material across the groove;

a pressure bladder, the pressure bladder is configured for being positioned in the groove on top of the sheet of thermoplastic material spread across the groove;

a press having a bottom surface, the press being movable toward and away from the groove, the bottom surface of the press being configured to engage against the pressure bladder positioned in the groove on top of the sheet of thermoplastic material spread across the groove;

a heat source connected in communication with the pressure bladder to selectively heat the pressure bladder and heat the sheet of thermoplastic material spread across the groove and conform the sheet of thermoplastic material to a cross-section configuration of the groove;

a cooling source connected in communication with the pressure bladder to selectively cool the pressure bladder and control cooling of the thermoplastic material and prevent shrinking of the thermoplastic material;

a base having a tool surface;

the groove being in the tool surface;

the bottom surface of the press is configured to engage against the tool surface of the base and against the pressure bladder positioned in the groove on the top of the sheet of thermoplastic material spread across the groove to press the sheet of thermoplastic material in multiple directions by the pressure bladder and the bottom surface of the press engaging against the tool surface of the base and against the pressure bladder.

14. The consolidation tool of claim 13, further comprising:
the pressure bladder is inflatable.

15. The consolidation tool of claim 13, further comprising:
a base having a tool surface;
a cavity recessed into the tool surface;
a first insert insertable into the cavity;
the groove is a first groove in the first insert;
the first insert is removable from the cavity; and,
a second insert, a second groove in the second insert, the second insert is insertable into the cavity when the first insert has been removed from the cavity.

16. The consolidation tool of claim 15, further comprising:
the first insert having a first cross-section configuration;
the second insert having a second cross-section configuration; and,
the first cross-section configuration and the second cross-section configuration being different cross-section configurations.

17. The consolidation tool of 15, further comprising:
the base being mobile.

18. The consolidation tool of claim 15, further comprising:
the first insert is heated.

19. The consolidation tool of claim 13, further comprising:

both the heat source and the cooling source are a variable pressure pump.

20. The consolidation tool of claim 13, further comprising:
the groove is configured for receiving the tube of thermoplastic material that has been braided from strips of thermoplastic material.

\* \* \* \* \*